United States Patent
Chronister

[11] Patent Number: 5,209,456
[45] Date of Patent: May 11, 1993

[54] TANK VALVE

[76] Inventor: Clyde H. Chronister, 6115 Bermuda Dunes, Houston, Tex. 77069

[21] Appl. No.: 898,368
[22] Filed: Jun. 15, 1992
[51] Int. Cl.⁵ ............................................. F16K 5/04
[52] U.S. Cl. .................................. 251/144; 251/355; 141/368; 141/383
[58] Field of Search ............... 251/144, 351, 352, 353, 251/349, 355; 141/368, 383, 384; 222/519

[56] References Cited
U.S. PATENT DOCUMENTS

| | | | |
|---|---|---|---|
| 1,652,929 | 12/1927 | Cawood | 251/351 X |
| 2,343,134 | 2/1944 | Cawood | 251/355 X |
| 3,948,481 | 4/1976 | Pollock | 251/351 |
| 4,150,809 | 4/1979 | Muller | 251/144 X |
| 4,269,237 | 5/1981 | Berger | 141/383 X |
| 4,991,821 | 2/1991 | Beaston | 251/144 X |

Primary Examiner—Martin P. Schwadron
Assistant Examiner—Kevin L. Lee
Attorney, Agent, or Firm—Fulbright & Jaworski

[57] ABSTRACT

A valve insertable in a threaded opening in a tank for loading, unloading, or sealing the tank. The valve includes a threaded blocking plug threadable into the opening, and a threaded pipe connected to the top of the plug for threading into the opening. The pipe includes a port adjacent its lower end whereby the tank may be emptied or filled when the port is positioned in the tank and the tank is sealed when the plug is positioned in the opening.

10 Claims, 3 Drawing Sheets

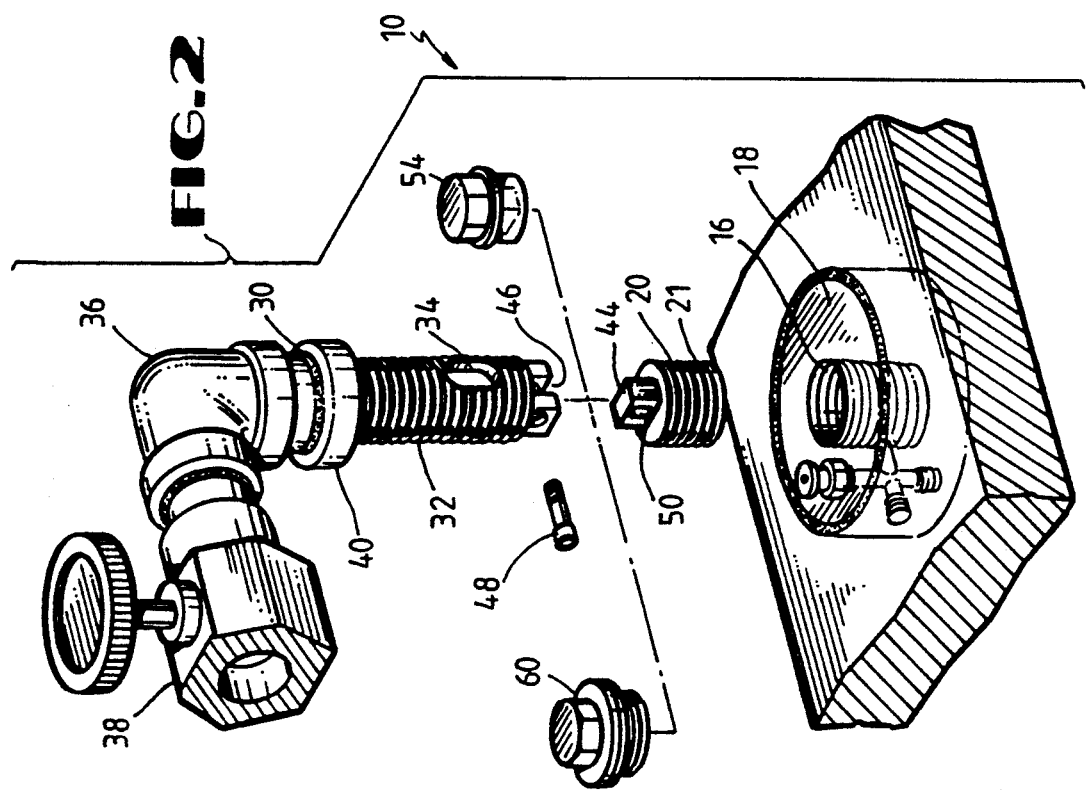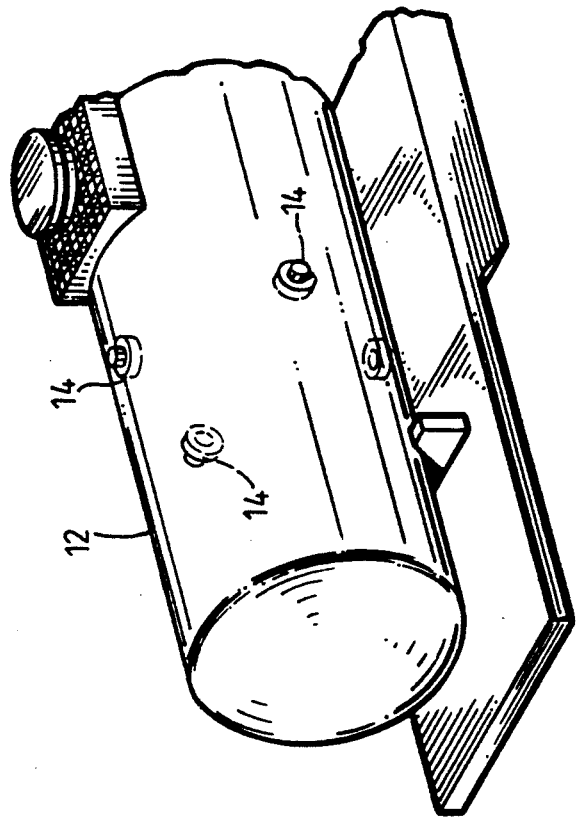

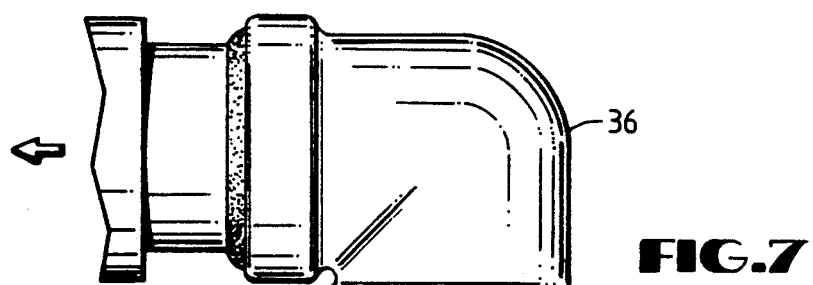
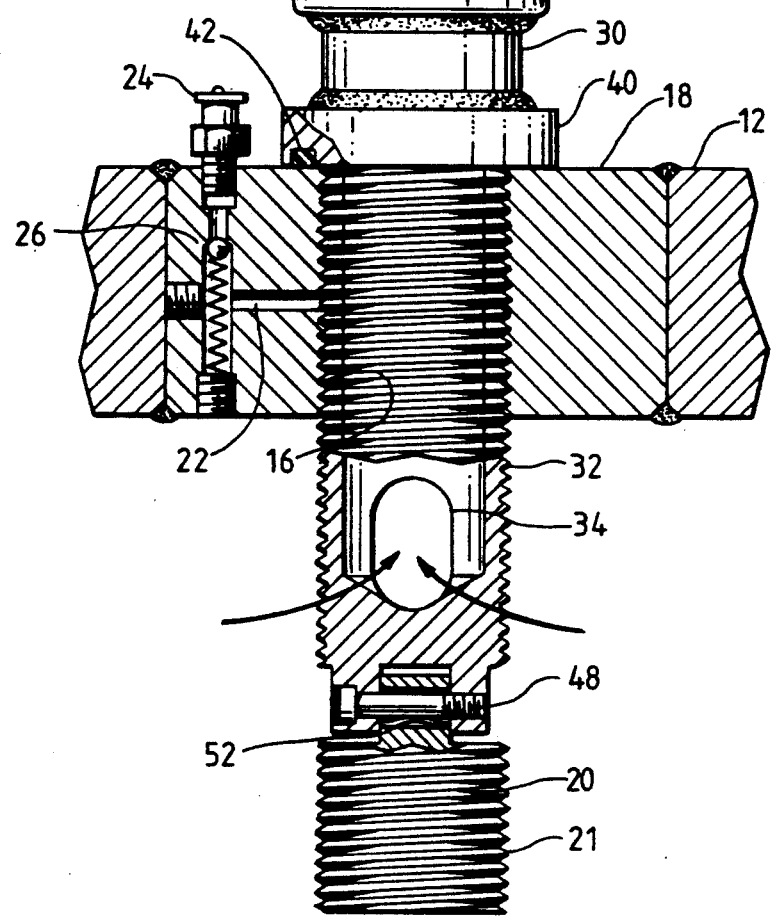
FIG. 7
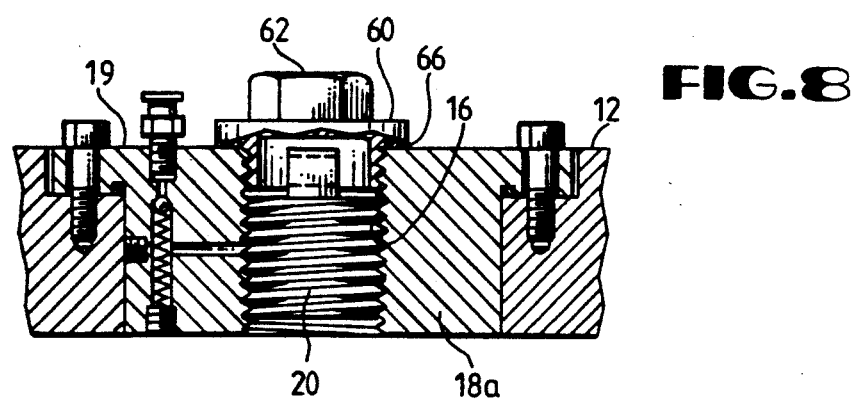
FIG. 8

TANK VALVE

BACKGROUND OF THE INVENTION

The present invention is directed to a valve for use in a tank for loading, unloading or sealing the tank. While this valve is useful for various type tanks, it is particularly useful in a mobile tank.

Valves especially for railroad tank cars and tank trucks must be capable of surviving accidents and collisions, and even over turning of the tank while still preventing the contents of the tank escaping through the valve. Generally, this requires a complicated valve, with protective features and consequently such valves are expensive.

The present valve can be used as a regular tank valve for loading or unloading product into the tank, or can be a backup safety unloading valve for use in an emergency. While the valve may extend out of the tank for loading and unloading, it can be manipulated to provide an internal tank valve which is generally flush with the tank and less subject to damage in the event of an accident.

SUMMARY OF THE INVENTION

The present invention is directed to a valve for use on a tank in which the tank has at least one opening and the opening has a threaded interior. The valve of the present invention is threadable into the opening for loading, unloading, or sealing the tank. The valve generally includes a threaded blocking plug threadable into the tank opening and the plug seals and closes the opening when positioned in the opening. A pipe is connected to the top of the plug and the pipe includes threads on the exterior of the pipe for threading the pipe into and out of the opening. The pipe includes a port adjacent the lower end of the pipe whereby the tank may be emptied or filled through the pipe when the port is positioned inside the tank. In the preferred embodiment the pipe includes an elbow and includes an off-on valve.

A still further object of the present invention is wherein the tank includes a plurality of threaded openings positioned around the perimeter of the tank for providing emergency unloading of the tank irrespective of the position of the tank.

Still a further object of the present invention is wherein the pipe is releasably connected to the plug for leaving the plug in a sealing position and removing the pipe and for reconnecting the pipe when it is desired to load or unload the tank through the threaded opening.

Yet a still further object of the present invention is the provision of a sealant passageway extending from the exterior of the tank to the threaded opening for providing a sealing lubricant around the threaded plug.

A still further object of the present invention is the provision of a threaded sealing cap adapted to be threadably connected to the opening over the threaded plug for providing dual seals in the opening.

A further object of the present invention is the provision of a tool coacting with the top of the plug for rotating the plug.

Still a further object of the present invention is wherein the pipe includes a stop shoulder on the exterior above the threads on the pipe and a seal is positioned on the stop shoulder for securely sealing the pipe in the opening.

A further object of the present invention is the inclusion of a releasably connection between the pipe and the plug in which the connection has a lost motion connection for allowing both the threads on the pipe and the threads on the plug to more easily mate with the threads in the opening.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is a fragmentary perspective view of a mobile tank having a plurality of valves of the present invention, FIG. 2 is a fragmentary exploded perspective of the valve of the present invention, FIG. 7 is a view similar to FIG. 3 but showing the valve in the loading or unloading position, and FIG. 8 is a fragmentary elevational view, partly in cross-section, illustrating the valve in a sealed position.

DESCRIPTION OF THE PREFERRED EMBODIMENT

Figure 3:
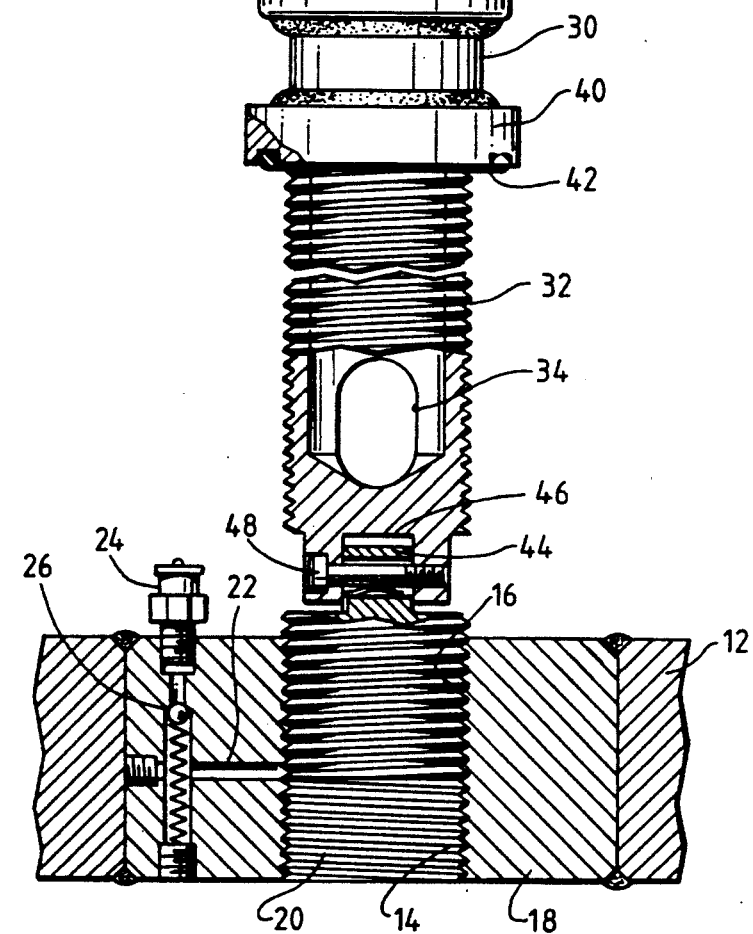
FIG. 3 is a fragmentary elevational view, partly in cross-section, illustrating the valve of the present invention.
Figure 4:
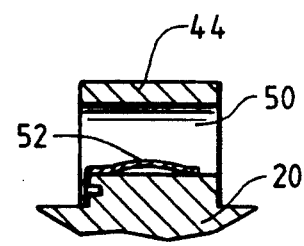
FIG. 4 is an enlarged fragmentary elevational view illustrating the connection between the valve pipe and the valve plug of the present invention.

While the present invention will be described in use in a mobile tank, for illustration only, it is also useful in other types of tanks. Referring now to the drawings, the reference 10 generally indicates the valve of the present invention for use in a mobile tank 12 such as a railroad tank car or tank truck. The tank 12 has at least one opening 14 or preferably a plurality of openings 14 depending upon the use and function of the valve 10. For example, if the valve 10 were to be used only for loading and unloading the tank 12, one opening 14 and valve 10 may be sufficient. However, if the use is for an emergency unloading valve, it would be preferable to provide a plurality of openings, such as four, positioned around the perimeter of the tank for emergency unloading of the tank 12 irrespective of its position in the event of an accident. Each opening 14 includes a threaded interior 16. The opening 16 can be provided in the tank 12 in various ways. One way is by a valve body 18 welded in the tank 12 (FIGS. 1, 3, and 7) in which the opening 14 and threaded interior 16 are provided. Another way is to provide a tank flange 19 (FIG. 8) connected to the tank 12. The valve is insertable into the threaded interior 16 for loading, unloading, or sealing the tank 12 as desired.

The valve 10 includes a threaded blocking plug 20 which is threadable into the opening 16. When a plug 20 is positioned in the opening 14, as best seen in FIG. 3, the plug 20 seals and closes the threaded opening 14. In order to increase the seal between the threaded plug 20 and the threaded interior 16, a lubricant sealant passageway 22 may extend from the exterior of the tank 12 to the opening 14 and may include a sealant fitting 24 and a check valve 26. Thus, any suitable sealant, such as any conventional lubricant used in lubricated plug valves, may be inserted through the fitting 24, through the check valve 26, through the passageway 22 to the threaded interior 16 of the opening 14.

The valve 10, as best seen in FIGS. 2 and 3 also includes a pipe 30 connected to the top of the plug 20. The pipe 30 includes threads 32 on the exterior of the pipe 30 for co-acting with the threaded interior 16 of the opening 14 for threading the pipe 32 into and out of the opening 14. The pipe 30 includes a port 34 adjacent the lower end of the pipe 30 whereby the tank 12 may be emptied or filled through the pipe 30 when the port 34 is positioned in the tank 12, as best seen in FIG. 7. Preferably the pipe 30 includes an elbow 36 and a conventional open-close valve 38. The elbow 36 aids in threading or unthreading the pipe 30 in the opening 14. The valve 38 provides additional flow control. Preferably, the pipe 30 also includes a stop shoulder 40 and seal 42.

In one mode of use, the plug 20 and the pipe 30 may be threadably inserted through the opening 16, as best seen in FIG. 7, to position the ports 34 inside of the tank 12. In this position, the tank 12 can be loaded or unloaded. For example, with the valve 10 positioned on the top of the tank 12 a product can be inserted through the pipe 30 and out of the ports 34 and into the interior of the tank 12. For unloading the valve 10 could be positioned on the bottom or even the top of the tank 12 and the product would be transmitted through the ports 34 and pipe 30 out of the tank 12. After the loading or unloading process, the pipe 30 would be unscrewed out of the tank 12 leaving the plug 20 positioned in the opening 14 (FIG. 3). Thus, the plug 20 would provide a seal blocking flow through the opening 14. If desired, additional sealant may be inserted through the fitting 24 to seal between the co-acting threads on the plug 20 and the thread 16. In this mode of operation, the pipe 30 would be transported along with the tank 12 to its destination. In the event of an accident, the pipe 30 may be sheared off but would leave the plug 20 in position in the opening 14 sealing and protecting the contents of the tank 12.

While the above-described structure and mode of operation could be performed with a rigid connection between the pipe 30 and the plug 20, the preferred embodiment of the present invention provides a releasable connection between the pipe 30 and the plug 20. Referring now to FIGS. 2, 3, 4 and 7, the releasable connection may include a lug 44 on the top of the plug 20, a receiving slot 46 on the bottom of the pipe 30 for receiving the lug and a bolt 48 for connecting the lug 44 into the slot 46. A releasable connection includes "play" or a lost motion between the pipe 30 and the plug 20 in order to allow the two different threads, the threads 32 on the pipe 30 and the threads 21 on the plug 20 to mate with the threaded interior 16 in the opening 14 as the pipe 30 and plug 20 are alternately engaged with an disengaged with the threaded interior 16. Such lost motion may be achieved by making the diameter of the hole 50 in the lug 44 greater than the diameter of the bolt 48. This allows the alignment of the threads 32 and 21 to mate with the threads 16 without having a precision machining of the parts. In addition, a spring 52 provides a resilient action in the lost motion connection for aiding in the alignment process.

In operating the valve 10 with the releasable connection, the valve 10 can be threaded into the thread 16, as best seen in FIG. 7 for loading or unloading the tank 12 as previously described in the first mode of operation. Thereafter, the pipe 30 is backed out of the tank 12 to the position as best seen in FIG. 3 leaving the plug 20 in, but slightly exposed to the exterior of the tank 12. In the positon of FIG. 3, the bolt 48 may be removed disconnecting the pipe 30 from the plug 20. While it is satisfactory to leave the plug 20 in the position shown in FIG. 3, it is preferable to screw the plug 20 further down into the opening 14 so that it is not exposed to the exterior of the tank 20 in case of an accident.

Figure 6:
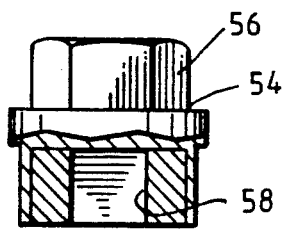
FIG. 6 is an enlarged elevational view, partly in cross-section, of a tool for co-acting and positioning the threaded plug of the present invention.

Referring now to FIG. 6, a tool 54 is provided having a noncircular top 56, such as a hex nut, for engagement by a tool or by hand and the tool 56 includes a slot 58 sized and shaped to engage the lug 44 on the top of the plug 20. By inserting the tool 54 over the lug 44, the plug 20 can be threaded downwardly into the interior of the opening 14.

Figure 5:
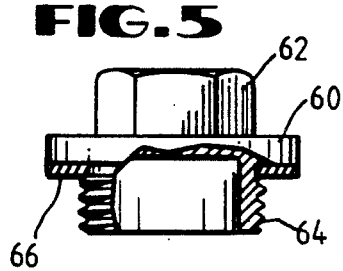
FIG. 5 is an enlarged elevational view, partly in cross-section, of the threaded sealing cap of the present invention.

Referring now to FIGS. 5 and 8, after the plug 20 is recessed into the valve body 18 (FIG. 3) or into the valve body 18a (FIG. 8) a threaded sealing cap 60 may be provided. The cap 60 includes a non-circular head 62, threads 64 which co-act with the threaded interior 16, and also includes a seal 66. The sealing cap 60 is threaded over the plug 20 and into the opening 14 to provide an additional seal along with the plug 20 and thus provides a back up seal assurance that the product in the tank 12 is securely sealed. A lock (not shown) can be provided with the cap 60, if desired, for greater security. In this mode of operation there is little structure left outside the exterior of the tank 12 for shearing off in the event of an accident. For mobile tanks the flange 19 could be recessed further into the tank and the sealing cap 60 and lubricant fitting 24 could also be recessed for greater protection. When the destination is reached, the operation may be reversed by removing the sealing cap 60, using the tool 54 or the lower end of the pipe 30 for screwing out the plug 20 for removal of the products from the tank 12 and/or reconnection to the plug 20 by the bolt 48.

The present invention, therefore, vis well adapted to carry out the objects and attain the ends and advantages mentioned as well as others inherent therein. While a presently preferred embodiment of the invention has been given for the purpose of disclosure, numerous changes in the details of construction, and arrangement of parts, will be readily apparent to those skilled in the art, and which are encompassed within the spirit of the invention and the scope of the appended claims.

What is claimed is:

1. A valve for use on a tank comprising,
    said tank having at least one opening, said opening having a threaded inteior,
    a valve inserted into the opening for loading, unloading, or sealing the tank including,
        a threaded blocking plug threadable into said opening, said plug sealing and closing the opening when positioned in said opening,
        a pipe connected to the top of the plug, said pipe including threads on the exterior of the pipe for threading the pipe into and out of the opening, and
        said pipe including a port adjacent the lower end of the pipe whereby the tank may be emptied or filled through the pipe when the port is positioned in the tank.

2. The valve of claim 1 wherein the tank includes a plurality of threaded openings positioned around the perimeter of the tank.

3. The valve of claim 1 wherein the pipe is releasably connected to the plug.

4. The valve of claim 1 wherein the pipe includes an off-on valve.

5. The valve of claim 1 wherein the pipe includes an elbow.

6. The valve of claim 1 including,
a sealant passageway extending from the exterior of the tank to the threaded opening.

7. The valve of claim 1 including,
a threaded sealing cap adapted to be threadably connected to the opening.

8. The valve of claim 1 including,
A tool coacting with the top of the plug for rotating the plug.

9. The valve of claim 1 wherein the pipe includes,
a stop shoulder on the exterior above the threads on the pipe, and
a seal on the stop shoulder.

10. The valve of claim 1 including a releasable connection between the pipe and the plug, said connection having a lost motion connection for allowing both the threads on the pipe and the threads on the plug to more easily mate with the threads in the opening.

* * * * *